United States Patent Office 2,929,683
Patented Mar. 22, 1960

2,929,683

PROCESS FOR THERMAL DECOMPOSITION OF SULFURIC ACID SLUDGES

Hunter Miley and Henry Sonneborn III, Petrolia, Pa., Gustave Schindler, Sands Point, N.Y., and Ferdinand W. Breth, Petrolia, Pa., assignors to L. Sonneborn Sons, Inc., a corporation of Delaware No Drawing. Application February 6, 1956
Serial No. 563,430

8 Claims. (Cl. 23—177)

This application is a new and useful process for the thermal decomposition of sulfuric acid sludges.

Sulfuric acid is used in the treatment of hydrocarbons and hydrocarbon distillates for a variety of purposes. Concentrated sulfuric acid is used to react with and remove undesirable components of petroleum hydrocarbons and hydrocarbon distillates, ranging from residua, heavy lubricating oils, kerosenes, naphthas and gasolines. Fuming sulfuric acid and sulfuric anhydride are used in the treatment of such petroleum distillates to remove all components other than naphthenes and paraffins in the production of so-called white oils, transformer oils, odorless kerosenes and distillates of lower boiling range. Sulfuric acid of about 98% concentration is used at around 0° C. as a cyclic reaction catalyst to catalyze the coupling of paraffins to unsaturates. This is technically known as alkylation. In each of the above cases the sulfuric acid enters into combination with an unsaturated hydrocarbon component to form a compound that is relatively insoluble in the residual treated hydrocarbon and may therefore be separately recovered. These sulfuric acid compounds are generically referred to as sludges and those resulting from the alkylation reaction are referred to as alkylation sludges.

Inasmuch as the sludges per se are of little economic value, it is important to recover the sulfur dioxide values, leaving a residue. As disclosed in the co-pending application of Hunter Miley, Serial No. 538,988, filed October 6, 1955, each particular sludge has a temperature of decomposition at which it is resolved into sulfur dioxide and a residue which is essentially a coke although still containing some volatile constituents. These decomposition temperatures lie within the general range of from 350–600° F. If the sludge is heated to a temperature which does not exceed this decomposition temperature by more than 50° F. the sulfur is selectively liberated in the form of sulfur dioxide contaminated with only relatively small amounts of hydrocarbon vapors. After subjecting the sulfur-dioxide containing gas to oxidation, with added air to convert the hydrocarbon vapors into carbon dioxide and water vapor, the sulfur dioxide may be reconverted to sulfuric acid by the contact process. Even with those sludges which have a relatively higher temperature of decomposition within the range specified, it is evident that the final temperature of thermal decomposition should not exceed 650° F.

One method of accomplishing this decomposition is to admix the sludge with a stream of coke particles moving continuously in a closed cycle, with the sludge particles heated to a predetermined temperature not over 50° F. in excess of the decomposition temperature of the particular sludge, and in amount sufficient to supply the heat required to elevate all of the sludge introduced to at least the decomposition temperature. This splits off the sulfur dioxide with only a very few percent of hydrocarbons in the gas phase, leaving a dry, granular residue which adds to the coke particles in the stream. The effluent gases are conducted away, admixed with air and burned to convert the hydrocarbons into carbon dioxide and water vapor, following which the gas so produced is returned to the sulfuric acid generator.

The coke particles move in a continuous cycle and, following removal of the sulfur dioxide, are again heated to the predetermined temperature and recycled to the point at which the sludge is admixed with the coke particles. The excess of coke which is continuously produced by decomposition of the sludge is continuously removed from the system.

The process and the apparatus in which the process is carried out are described in detail in said co-pending application, Serial No. 538,988. Another process in which the sludge may be decomposed by heating within controlled limits is described in U.S. Patent No. 2,395,-503. This also utilizes a stream of coke particles moving continuously in a closed cycle, but in this case the coke at the point of mixing with the sludge is below the temperature of decomposition of the sludge and the heat necessary to effect the decomposition is thereafter introduced by indirectly heating the mixture.

One limitation on each of the processes described is that they do not operate to best advantage with those sludges in which the titratable acidity of the sludge, assumed as $H_2SO_4=75\%$ or more. In these cases decomposition under the conditions recited is incomplete and undecomposed sludge builds up in the system to eventually interfere with the free movement of the stream of solid particles and/or cause free sulfuric acid to vaporize. One sludge which is particularly difficult to process in systems of the type described is the so-called alkylation sludge, which is a residue from the use of concentrated sulfuric acid as a cyclic reaction catalyst in the coupling of olefins with paraffins to introduce an alkyl radical as side chain.

We have found, however, that such sludges of a titratable acidity of at least 75% can be processed continuously in systems of the type described, with substantially complete decomposition of the acid and the production of a free-flowing granular coke residue, if prior to the mixing of the sludge with the coke particles the sludge is commingled with a relatively small amount of a heavy hydrocarbon oil. The oils referred to are those which do not have more than a few percent boiling below 500° F. and preferably not more than a few percent boiling below 700° F. The mixing is preferably carried out continuously immediately prior to the introduction of the sludge to the decomposer. This may be done in any suitable type of mixer adapted to commingle two liquid phases. The amount of the oil may vary within the limits of from 2–15% by weight in relation to the sludge, the larger amounts being required for those sludges with higher titratable acidity. Even relatively small amounts will suffice with those sludges of lower titratable acidity to eliminate completely the operating difficulties otherwise encountered with such sludges.

*Example 1*

As a practical example of the operation of our process an alkylation sludge which, on titration, analyzed 87.8% $H_2SO_4$ could not be successfully processed in the apparatus and in accordance with the process described in said co-pending application, Serial No. 538,988.

This was commingled with 5% of a bunker "C" fuel oil having an initial boiling point of about 700° F. The mixture of alkylation sludge and oil was processed with entire success in the process and apparatus described in said co-pending application, with the production of a dry, granular coke residue. The top temperature of the mixture was 600° F. and the yield of $SO_2$ corresponded to 89.5% of the sulfuric acid content of the sludge as determined by titration.

*Example 2*

As a further practical example of the application of our process, an alkylation sludge which, on titration, analyzed 85.2% $H_2SO_4$ could not be successfully processed in apparatus and in accordance with the process described in said co-pending application, Serial No. 538,988. This was intimately mixed with 5% of the same oil referred to in the preceding example. The mixture of alkylation sludge and oil was processed with success in the process and apparatus described in said co-pending application. The coke was granular but not completely dry and brittle. The yield of sulfur dioxide corresponded to 76.4% of the sulfuric acid content of the sludge as determined by titration.

*Example 3*

As a further practical example of the application of our process an alkylation sludge which, on titration, analyzed 87.8% $H_2SO_4$ could not be successfully processed in apparatus and in accordance with the process described in said co-pending application, Serial No. 538,988. This was intimately mixed with 10% of the same oil referred to in the preceding example.

The mixture of alkylation sludge and oil was processed with entire success in the process and apparatus described in said co-pending application, with the production of a dry, brittle, granular coke residue. The top temperature of the mix was 540° F. and the yield of $SO_2$ corresponded to 79.8% of the sulfuric acid content of the sludge as determined by titration.

We claim:

1. In the decomposition of sulfuric acid akylation sludges derived from the treatment of hydrocarbons with sulfuric acid and containing titratable acidity equivalent to at least 75% calculated as $H_2SO_4$ by admixing the same with a stream of coke particles moving in a closed cycle, thereby forming a mixture, subjecting said mixture to temperatures at which said sludge is selectively decomposed with the production of a coke residue and a gas consisting substantially exclusively of sulfur dioxide, the improvement which comprises admixing a hydrocarbon oil substantially free from components boiling below 500° F. with said sludge prior to admixing the same with said stream of coke particles, said hydrocarbon oil being added in an amount sufficient to produce a dry granular coke as the residue of the process.

2. Process according to claim 1 in which the amount of oil admixed ranges from 2–15% by weight of said sludge.

3. In the decomposition of sulfuric acid alkylation sludges derived from the treatment of hydrocarbons with sulfuric acid and containing titratable acidity equivalent to at least 75% calculated as $H_2SO_4$ by admixing the same with a stream of coke particles moving in a closed cycle, thereby forming a mixture, subjecting said mixture to temperatures at which said sludge is selectively decomposed with the production of a coke residue and a gas consisting substantially exclusively of sulfur dioxide, the improvement which comprises admixing a hydrocarbon oil substantially free from components boiling below 700° F. with said sludge prior to admixing the same with said stream of coke particles, said hydrocarbon oil being added in an amount sufficient to produce a dry granular coke as the residue of the process.

4. Process according to claim 3 in which the amount of oil admixed ranges from 2–15% by weight of said sludge.

5. In the decomposition of sulfuric acid alkylation sludges derived from the treatment of hydrocarbons with sulfuric acid and containing titratable acidity equivalent to at least 75% calculated as $H_2SO_4$ by admixing the same with a stream of coke particles moving in a closed cycle, thereby forming a mixture, subjecting said mixture to temperatures not exceeding 650° F. at which said sludge is selectively decomposed with the production of a coke residue and a gas consisting substantially exclusively of sulfur dioxide, the improvement which comprises admixing a hydrocarbon oil substantially free from components boiling below 500° F. with said sludge prior to admixing the same with said stream of coke particles, said hydrocarbon oil being added in an amount sufficient to produce a dry granular coke as the residue of the process.

6. Process according to claim 5 in which the amount of oil admixed ranges from 2–15% by weight of said sludge.

7. In the decomposition of sulfuric acid alkylation sludges derived from the treatment of hydrocarbon with sulfuric acid, and containing titratable acid equivalent to to at least 75% calculated as $H_2SO_4$ by admixing the same with a stream of preheated coke particles moving in a closed cycle, thereby forming a mixture at a temperature at which the sludge is selectively decomposed with the production of a coke residue and a gas consisting substantially exclusively of sulfur dioxide, the improvement which comprises admixing a hydrocarbon oil substantially free from components boiling below 700° F. with said sludge prior to admixing the same with said stream of coke particles, said hydrocarbon oil being added in an amount sufficient to produce a dry granular coke as the residue of the process.

8. Process according to claim 7 in which the amount of oil admixed ranges from 2 to 15% by weight of said sludge.

References Cited in the file of this patent

UNITED STATES PATENTS

| | | |
|---|---|---|
| 1,682,060 | Moser et al. | June 7, 1932 |
| 2,571,107 | Breth | Oct. 16, 1951 |

FOREIGN PATENTS

| | | |
|---|---|---|
| 459,978 | Canada | Sept. 27, 1949 |